US009122803B1

(12) United States Patent
Michelsen

(10) Patent No.: US 9,122,803 B1
(45) Date of Patent: Sep. 1, 2015

(54) COLLABORATIVE SOFTWARE DEFECT DETECTION

(75) Inventor: John J. Michelsen, Irving, TX (US)

(73) Assignee: INTERACTIVE TKO, INC., Plano, TX (US)

(*) Notice: Subject to any disclaimer, the term of this patent is extended or adjusted under 35 U.S.C. 154(b) by 629 days.

(21) Appl. No.: 13/155,365

(22) Filed: Jun. 7, 2011

Related U.S. Application Data

(60) Provisional application No. 61/407,015, filed on Oct. 26, 2010.

(51) Int. Cl.
| | |
|---|---|
| *G06F 9/44* | (2006.01) |
| *G06F 11/36* | (2006.01) |
| *G06F 11/34* | (2006.01) |
| *G06F 9/445* | (2006.01) |

(52) U.S. Cl.
CPC ........ *G06F 11/3684* (2013.01); *G06F 11/3466* (2013.01); *G06F 9/44589* (2013.01); *G06F 11/3688* (2013.01)

(58) Field of Classification Search
CPC ............ G06F 11/3688; G06F 11/3664; G06F 11/3684; G06F 9/44589; G06F 11/3466; G06F 11/3419
See application file for complete search history.

(56) References Cited

U.S. PATENT DOCUMENTS

| | | | |
|---|---|---|---|
| 5,450,586 A | 9/1995 | Kuzara et al. | |
| 5,581,696 A | 12/1996 | Kolawa et al. | |
| 6,002,871 A | 12/1999 | Duggan et al. | |
| 6,249,882 B1 | 6/2001 | Testardi | |
| 6,473,707 B1 | 10/2002 | Grey | |
| 6,587,969 B1 | 7/2003 | Weinberg et al. | |
| 6,601,020 B1 | 7/2003 | Myers | |
| 6,668,371 B2 | 12/2003 | Hamilton et al. | |
| 7,392,507 B2 | 6/2008 | Kolawa et al. | |
| 7,568,183 B1* | 7/2009 | Hardy et al. | 717/121 |
| 7,836,346 B1* | 11/2010 | Davidov et al. | 717/124 |
| 8,117,591 B1* | 2/2012 | Michelsen | 717/109 |
| 8,146,057 B1* | 3/2012 | Michelsen | 717/124 |
| 2004/0025083 A1 | 2/2004 | Nanja et al. | |
| 2004/0068560 A1 | 4/2004 | Oulu et al. | |
| 2004/0123272 A1 | 6/2004 | Bailey et al. | |
| 2004/0225919 A1 | 11/2004 | Reissman et al. | |
| 2005/0097516 A1* | 5/2005 | Donnelly et al. | 717/124 |
| 2006/0048100 A1 | 3/2006 | Levy et al. | |
| 2006/0059169 A1 | 3/2006 | Armishev | |

(Continued)

OTHER PUBLICATIONS

LISA Developer's Guide, Version 2.0, Mar. 13, 2003, Interactive TKO, Inc., pp. 1-23; <www.itko.com>.*

(Continued)

*Primary Examiner* — Thuy Dao
*Assistant Examiner* — Ben C Wang
(74) *Attorney, Agent, or Firm* — Patent Capital Group

(57) ABSTRACT

A request to generate a defect report is received for a defect observed within a software system under test. Context information is identified, provided by a plurality of instrumentation units, each instrumentation unit in the plurality of instrumentation units monitoring one or more respective software components within the system under test. The context information identifies characteristics of transactions performed in the system under test. At least some of the identified context information is automatically associated with the defect. The requested defect report is generated to include the context information associated with the identified defect.

22 Claims, 4 Drawing Sheets

(56) References Cited

U.S. PATENT DOCUMENTS

| | | | |
|---|---|---|---|
| 2007/0234293 A1* | 10/2007 | Noller et al. | 717/124 |
| 2008/0010537 A1* | 1/2008 | Hayutin et al. | 714/38 |
| 2008/0141221 A1* | 6/2008 | Benesovska et al. | 717/124 |
| 2009/0007074 A1* | 1/2009 | Campion et al. | 717/124 |
| 2009/0089757 A1* | 4/2009 | Rajan et al. | 717/124 |
| 2009/0199047 A1* | 8/2009 | Vaitheeswaran et al. | 714/47 |
| 2009/0199160 A1* | 8/2009 | Vaitheeswaran et al. | 717/124 |
| 2010/0251263 A1* | 9/2010 | Coelho et al. | 719/314 |
| 2011/0067005 A1* | 3/2011 | Bassin et al. | 717/127 |
| 2011/0258609 A1* | 10/2011 | Maczuba | 717/124 |
| 2013/0067298 A1* | 3/2013 | Li et al. | 714/799 |
| 2014/0033176 A1* | 1/2014 | Rama et al. | 717/124 |
| 2015/0095890 A1* | 4/2015 | StClair et al. | 717/124 |

OTHER PUBLICATIONS

Rob Hailstone, LISA Suite—v5.0, Jun. 2010, Interactive TKO (iTKO), pp. 1-10; <www.itko.com/resourcesdocs/OvumTechAnalysis_iTKO_LISA5Suite.pdf>.*

LISA User's Guide, Version 2.0, Feb. 27, 2003, Interactive TKO, Inc., pp. 1-130; <www.itko.com>.*

Ochodek et al., "Automatic Transactions Identification in Use Cases", Springer Berlin Heidelberg 2008, IFIP 2008, LNCS 5082, May 1, 2008, pp. 55-68; <http://link.springer.com/chapter/10.1007%2F978-3-540-85279-7_5#page-1>.*

Strecker et al., "Accounting for Defect Characteristics in Evaluations of Testing Techniques", 2012 ACM, Vo. 21, No. 3, Article 17, pub. date: Jun. 2012, pp. 17:1-17:43; <http://dl.acm.org/results.cfm?h=1&cfid=502083833&cftoken=15311672>.*

Malhotra et al., "Defect Collection and Reporting System for Git based Open Source Software", 2014 IEEE, ICDMIC 2014, Sep. 5, 2014, pp. 1-7; <http://ieeexplore.ieee.org/stamp/stamp.jsp?tp=&arnumber=6954234>.*

LISA, 2.0 User's Guide, Interactive TKO, Feb. 27, 2003, pp. 1-130.

LISA, 2.0 Developer's Guide, Interactive TKO, Mar. 13, 2003, pp. 1-23.

OASIS, "ebXML Test Framework DRAFT Document—Version 0.91", Dec. 2002, The Organization for the Advancement of Structured Information Standards, 92 pages.

* cited by examiner

COLLABORATIVE SOFTWARE DEFECT DETECTION

This patent application claims the benefit of priority under 35 U.S.C. §120 of U.S. Provisional Patent Application Ser. No. 61/407,015, filed Oct. 26, 2010, entitled "COLLABORATIVE SOFTWARE DEFECT DETECTION", which is expressly incorporated herein by reference in its entirety.

TECHNICAL FIELD

This invention relates to software testing and, more particularly, to systems in which different users act as testers and developers.

BACKGROUND

In many testing scenarios, it is difficult to determine how each of several different components of a software system is affecting performance. For example, a software developer may be unable to determine whether a new application is responding too slowly due to performance problems within the application itself, network congestion affecting the application's interactions with a web server from which the application obtains necessary data, or a sluggish database that the web server interacts with. Since each of these components may be implemented independently, it is difficult to be able to test all of the components in a manner that captures the interactions between the components. Furthermore, since some of the components may not allow modification of their code for testing purposes, this difficulty may be exacerbated.

This complexity can also frustrate testing scenarios in which the person performing the testing is not the person responsible for fixing defects found in the testing process. In a typical scenario, a quality assurance (QA) analyst interacts with the software under test. Whenever the QA analyst detects that the software is not functioning properly, the QA analyst documents the error and submits a report to the development personnel. Unfortunately, such defect reports often lack enough information and details to enable the development team to reproduce and/or fix the defect. This leads to frustration and wasted time and effort on the parts of both QA and development personnel.

SUMMARY

In general, one aspect of the subject matter described in this specification can be embodied in methods that include the actions of receiving a request to generate a defect report for a defect observed within a software system under test. Context information can be identified, using at least one processing device, the context information provided by a plurality of instrumentation units, each instrumentation unit in the plurality of instrumentation units monitoring one or more respective software components within the system under test. The context information can identify characteristics of transactions performed in the system under test. At least some of the identified context information can be automatically associated with the defect. The requested defect report can be generated to include the context information associated with the identified defect.

In another general aspect of the subject matter described in this specification, a system can include a memory element storing data, a processor operable to execute instructions associated with the stored data, and a collaborative defect detection module. The collaborative defect detection module can be configured to identify context information in response to a request to generate a defect report for a defect observed within a software system, the context information provided by a plurality of instrumentation units monitoring software components within the system under test, the context information identifying characteristics of transactions performed in the system under test. The collaborative defect detection module can be further configured to automatically associate at least some of the identified context information with the defect for inclusion in the requested defect report.

In still another general aspect, subject matter described in this specification can be embodied in methods that include the actions of monitoring a first software component, using an instrumentation unit interfacing with the first software component, the first software component included within a particular software system. A first set of information can be captured using the instrumentation unit, the first set of information including context information identifying characteristics of involvement of the first software component in a particular transaction involving at least one other second software component. The first set of information can be provided, from the instrumentation unit, to a collaborative defect detection module for use by the collaborative defect detection module in associating context information captured by the instrumentation agent with one or more defects identified in requests to generate one or more defect reports, and inclusion of the associated context information within the one or more defect reports.

These and other embodiments can each optionally include one or more of the following features. The request to generate the defect report can include defect identification data identifying characteristics of the identified defect. Automatically associating at least some of the identified context information with the defect can include identifying a correlation between the characteristics identified in the defect identification data and characteristics of transactions identified in context information. The identified correlation can include a correlation between a particular software component identified in each of the defect identification information and context information. The identified correlation can include a correlation between first timing information identified in the defect identification information and second timing information identified in the context information. The first timing information can identify timing of the defect and the second timing information can identify timing of a particular transaction performed by the system under test. The identified correlation can include a correlation between aspects of a particular transaction identified in both the defect identification information and context information. The identified correlation can include a correlation between aspects of a particular data structure identified in both the defect identification information and context information. The defect identification data can include user-entered data describing aspects of the defect as observed by a user. User-entered data can be collected from a user interface automatically launched in connection with the request to generate the defect report. In some instances, the user interface can be launched from an interface of a particular software component. Such a user interface can be launched by a particular instrumentation unit monitoring the particular software component. The defect identification data can also include data automatically collected identifying a context of the receipt of the request to generate the defect report. The context of the receipt of the request to generate the defect report can include a time at which the request to generate the defect was received and/or an identity of a particular test run proximate in time with the received request to generate the defect report. The defect identification data can also include a screenshot associated with a particular software component affected by the observed defect. Such screenshots can be automatically captured in response to the receipt of the request to generate the defect report.

Further embodiments can each optionally include one or more of the following features. Automatically associating at least some of the identified context information with the defect can include identifying that the defect is potentially related to a particular transaction performed in the system and associating context data identifying characteristics of the particular transaction with the defect. Context information can include a first set of information generated by a first instrumentation unit in the plurality of instrumentation units monitoring a first software component within the system under test and a second set of information generated by a second instrumentation unit in the plurality of instrumentation units monitoring a second software component within the system under test. Each of the first and second sets of information can identify characteristics of the particular transaction. Further, the first and second software components can be involved in the particular transaction. The first set of information can be captured by an instrumentation unit based, at least in part, on data sent between the first and second software components during the particular transaction. Data sent between the first and second software components can be received by the first software component from the second software component. The first set of information can include an identification of the involvement of the second software component in the particular transaction. The first set of information captured by an instrumentation unit can include timing information and an association between context information and a defect can be based on a correlation in timing between the defect and one or more transactions identified in the context information. A defect, in some instances, can involve a webpage served by a web server and displayed in a web browser and the request to generate the defect report is received via the web browser.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

BRIEF DESCRIPTION OF THE DRAWINGS

Like reference symbols in the various drawings indicate like elements.

DETAILED DESCRIPTION

Figure 1:
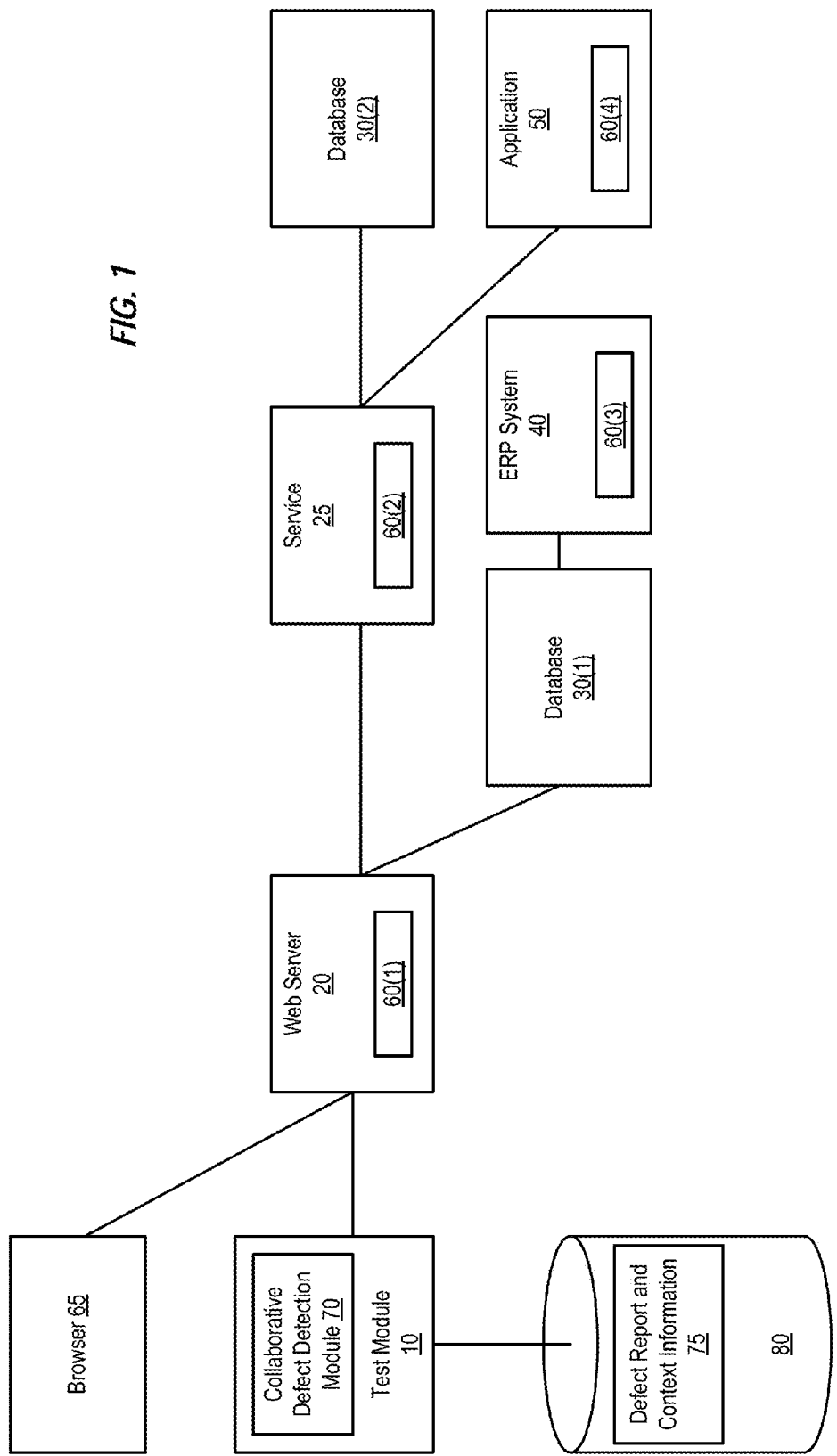
FIG. 1 is a block diagram of an example test system in which a software architecture including multiple independent software components is being tested.

FIG. 1 is a block diagram of a test system in which an example software architecture is tested that includes multiple independent software components. For instance, in the particular example shown, the software architecture includes a test module 10, and software components including a web server 20, a service 25, databases 30(1) and 30(2), an enterprise resource planning (ERP) system 40, one or more applications 50, among other components. All or some of these components can be implemented in software that is executing on one or more computing devices (e.g., a personal computer, server, personal digital assistant, smartphone, tablet computer, or the like).

The components shown in FIG. 1 can all be implemented on the same computing device. However, in many embodiments, at least some of these components (or portions thereof) will be implemented on different computing devices, all or some of which can be coupled via one or more networks (e.g., a local area network, storage area network, and/or wide area network such as the Internet). For instance, various software components within a system can be implemented as a composite or distributed software system, including systems implemented adopting cloud-based architectures.

Software components tested using an example test system can include both production-ready components, as well as software component under development. For instance, at least some of components may still be in a development and/or testing phase. Other components may already be in production (e.g., these components have already been tested and released and are now being used in a production environment). The components that are still in development and/or undergoing testing are referred to as being pre-production components.

In the example of FIG. 1, a web server 20 component can be provided that is configured to provide web pages to web browsers such as browser 65. A service 25 can provide any of a variety of different services for consumption by one or more clients and can be implemented as any one or more of a variety of software components. For example, service 25 can be a web service (e.g., having an interface defined by a web service definition language (WSDL) file), a web site (e.g., as implemented by one or more web pages provided by a web server), enterprise service, or other such service. Further, services (e.g., 25) can each be implemented as an object or other component (e.g., an enterprise service bus (ESB) construct, an Enterprise JavaBean™ (EJB), a web component such as a JavaServer Pages™ (JSP) page or Java™ servlet component, other standalone Java™ component, or Java™ applet), as an application that includes any of the previously-mentioned components, or the like.

Databases 30(1) and 30(2) can each include a database server and/or database management system configured to assist in responding to requests to access information stored in a database. Application 50 can be any of a variety of different applications or programs and can include one or more of a variety of different software components. Other components can also be included in a testing system beyond those illustrated in the particular example of FIG. 1, including a legacy application operating on a mainframe, a data service, an order manager, a transactional data store, an enterprise application integration (EAI) system, among other examples.

In some instances, a system including many independent components (such as in the example of FIG. 1) can make testing difficult. For instance, errors caused by a malfunction in one component can manifest as errors in results returned by other component, including components downstream from the malfunctioning component. As shown in the example of FIG. 1, the operation of web server 20 can depend upon service 25 and database 30(1). The operation of service 25 can in turn depend upon database 30(2) and application 50, while the operation of database 30(1) in turn depends upon ERP system 40. Thus, if a QA analyst attempts to test web server 20 by interacting with web server 20 via browser 65, any defects that are detected during the test may manifest at the web server 20 but nonetheless originate in components other than web server 20 (such as service 25 or database 30(1)). Further, a QA analyst may lack in-depth knowledge concerning each of the components in the system and may have limited insight into the architecture of the system under test. Additionally, in some instances, one or more of the software components in a system can be provided and controlled by separate entities, thereby decentralizing knowledge concerning the operation of the individual components in the system, making diagnosis of defects all the more difficult. Consequently, in some instances, without assistance from a collaborative defect detection module, such as described below, the QA analyst may not be able to properly describe the appropriate context of the identified defect in defect reports submitted to assist developers in reproducing and/or repair the defect.

In some instances, one or more software components in a system under test may include instrumentation units each adapted to monitor activity of a respective software component. For instance, in some examples, an instrumentation unit may be integrated with, coupled to, interface with, or otherwise be associated with a corresponding software component and be adapted to monitor and collect data describing the functioning of the corresponding software component in connection with a test of the software system including the corresponding software component. Continuing with the example of FIG. 1, in one instance, web server 20 can include instrumentation unit 60(1), service 25 can include instrumentation unit 60(2), ERP system 40 can include instrumentation unit 60(3), and application 50 can include instrumentation unit 60(4). These instrumentation units (collectively referred to as instrumentation units 60) can monitor the operation of the respective software component in which they are included, are coupled to, or interface with and send information describing the operation of those components back to test module 10, in connection with the execution of a particular test.

In some instances, instrumentation units 60 can include functionality and/or be implemented using techniques similar to those described in U.S. patent application Ser. No. 12/570,554, titled "Modeling and Testing Interactions Between Components of a Software System," filed Sep. 30, 2009, and listing Cameron David Bromley and John J. Michelsen as inventors, which is hereby incorporated by reference in its entirety as if completely and fully set forth herein. In some examples, instrumentation units 60 can additionally, optionally, or alternatively include functionality and/or be implemented using techniques similar to those described in U.S. patent application Ser. No. 13/155,363 titled "Modeling and Testing of Interactions Between Components of a Software System," filed on Jun. 7, 2011, and listing Jean-David "JD" Dahan and John J. Michelsen as inventors, which is hereby incorporated by reference in its entirety as if completely and fully set forth herein.

Instrumentation units 60 can be configured to provide visibility into the operations of each software component included within a system examined using test module 10. Coupling an instrumentation unit 60 to a software component can be referred to instrumenting the software component, i.e., for monitoring during a test. Alternatively, instrumentation units 60 can be disabled during use and operation of software component outside of a testing environment (e.g., within a production environment), or during phases of system testing that do not directly involve the particular software component. Each instrumentation unit 60 can be further configured to detect requests and responses being sent to and from the component (e.g., from and to other components in the system) in which that instrumentation agent is embedded. Each instrumentation unit 60 can also be configured to generate information about the detected requests and/or responses and to report that information, for example, to test module 10. Additionally, each instrumentation unit 60 can be configured to detect and report on activity that occurs internally to the component in which the instrumentation agent is embedded.

In response to detecting a request, response, and/or other activity to be monitored, each instrumentation agent 60 can be configured to detect one or more characteristics and gather associated data relating to that activity and/or the monitoring of that activity by the instrumentation agent. Such characteristics can include a wide array of information such as a system clock value, current processor and/or memory usage, contents of the request, contents of the response to the request, identity of the requester that generated the request, identity of the responder generating the response to the request, Java™ virtual machine (JVM) statistics, standard query language (SQL) queries (SQLs), number of database rows returned in a response, logging information (e.g., messages logged in response to a request and/or response), error messages, simple object access protocol (SOAP) requests, values generated by the component that includes the instrumentation agent but that are not returned in the response to the request, web service invocations, EJB method invocations, EJB entity lifecycle events, heap sizing, among many other types of information. Characteristics can also include the thread name of a thread processing the request to generate the response, the class name of the class of an object invoked to process the request to generate the response, a Web Service signature used to contain the request and/or response, arguments provided as part of the request and/or response, a session identifier, an ordinal (e.g., relating to an order within a transaction), the duration of time spent processing the request and/or generating the response, state information, a local Internet Protocol (IP) address, a local port, a remote IP address, a remote port, among many other examples. Such information, characteristics, and associated data gathered by an instrumentation agent can be embodied in data records, or frames, including frames specific to a particular transaction to which the characteristics apply. Further, this information can be used as context information and be compared against similar information and information types gathered in connection with a request to generate a defect report (e.g., in connection with user entries in a defect reporting form or interface).

Test module 10 can store information returned to by the instrumentation units 60. Such information returned from the instrumentation units can be referred to as context information. This information can be used, for instance, to trace the flow of execution through the system under test for each transaction, so that information that describes characteristics of a portion of a particular transaction is grouped with other information describing the same transaction. Additionally, context information can be used to identify characteristics of request and responses sent between software components, the amount of data involved in a transaction, the identity and roles of software components within a transaction, as well as any other characteristic including those examples listed above and others. Further, a collaborative defect detection module 70 can be provided for use in analyzing information returned from different instrumentation agents to identify relationships and correlations between the returned information and group individual subsets of information, each of which can be generated by a different instrumentation agent 60, into one or more sets of information describing complete transactions involving, for example, multiple different software components.

In the example of FIG. 1, instrumentation agent 60(1) on web server 20 can monitor activities and operations performed by web server 20, including the service of web pages provided using web server 20. Instrumentation agent 60(1) can collect a myriad of data concerning requests for web resources, user interactions with web page components, calls to and the receipt of data from other services (e.g., 25) and databases (e.g., 30(1)), among other examples. Further, instrumentation agent 60(1) can additionally provide a tester with functionality for launching a defect reporting interface for use by the tester (and test module 10) in generating defect reports relating to the operation of and transactions involving web server 20. Such a reporting interface can be launched, for example, in connection with the inclusion of a special icon, text, or other selectable area displayed in connection with an interface of web server (or browser 65 displaying web pages served by web server 20). Alternatively, a reporting interface can also be launched in response to the entry of special combinations of keys. While in some embodiments, the software component and test module can directly handle requests to launch a defect report interface, such functionality can be handled by the instrumentation agent assigned to the corresponding software component.

When a tester encounters a potential defect, the tester can access the defect reporting interface. This interface can prompt the tester to provide various information, such as the tester's name, the description of the defect, and the like. The interface can also provide the tester with an option to create a screenshot of the browser window in which the potential defect was encountered. Once the tester has entered all of the information and selected to submit the defect report, the interface then provides this information to collaborative defect detection module 70.

In response to receiving a defect report or a request to generate, collaborative defect detection module 70 searches for context information associated with the defect report. For instance, one or more databases, storage elements, data records, or other such data resources can be searched that store frames and context information gathered, intercepted, and generated by various instrumentation units in connection with the instrumentation units' monitoring of various software components in the system. Such a search can be based on information identified a defect report or request to generate the defect report, including automatically and user-entered information. For instance, in the example of FIG. 1, defect information identifying the web server that generated the web page from which the defect report was generated, information identifying the web session in which the defect was detected, timestamps, and the like can be used as the basis of a search. Once matching information is found, the defect report can be associated with matching context information for one or more related transactions.

In other instances, additional operations can be performed to determine whether context information and frames returned in the search are relevant to the identified defect and should be associated with, and appended to, the corresponding defect report. For instance, returned context information can be processed against information included in the defect report (or request to generate the defect report) to identify correlations between attributes of the defect documented in the defect report and attributes of certain software components and transactions documented in the context information gathered by the instrumentation units. For example, a correlation in timing of the defect and one or more transactions can be identified. A common transaction, data structure, software component, network connection, or other aspect can also be identified as described in both the defect report and certain context information. Further, upon identifying such a correlation, additional context information relating to and describing the involvement of a particular transaction or one or more software components, can also be included and associated with the defect report.

Thus, the system of FIG. 1 provides a web-based interface for reporting defects in a manner that allows associated underlying context information, which is not necessarily available or known to the tester that reported the defects, to be associated with the reported defects. This information can be used, in some examples, to supplement the information provided in the defect report as well as to recreate the situation in which the defect arose. The developer that processes this information can thereby be provided with the pertinent information needed to recreate the situation and more thoroughly address the identified defect.

It should be appreciated that the example of FIG. 1, is a non-limiting example, offered for purposes of illustration only. Additional implementations and aspects can be realized using systems, principles, and features similar to those described above. As an example, a defect can be identified in connection with an application, service, or other software component other than a web server, with dependencies different than those described in the example of FIG. 1. Further, defect reports can be generated in connection with the testing, analysis, or use of any type of software component, including production and pre-production software components and systems. Indeed, defect reports can be requested in connection with a test of a system as well as in connection with live execution of a system, including the testing or execution of the system's constituent software components.

Figure 2:
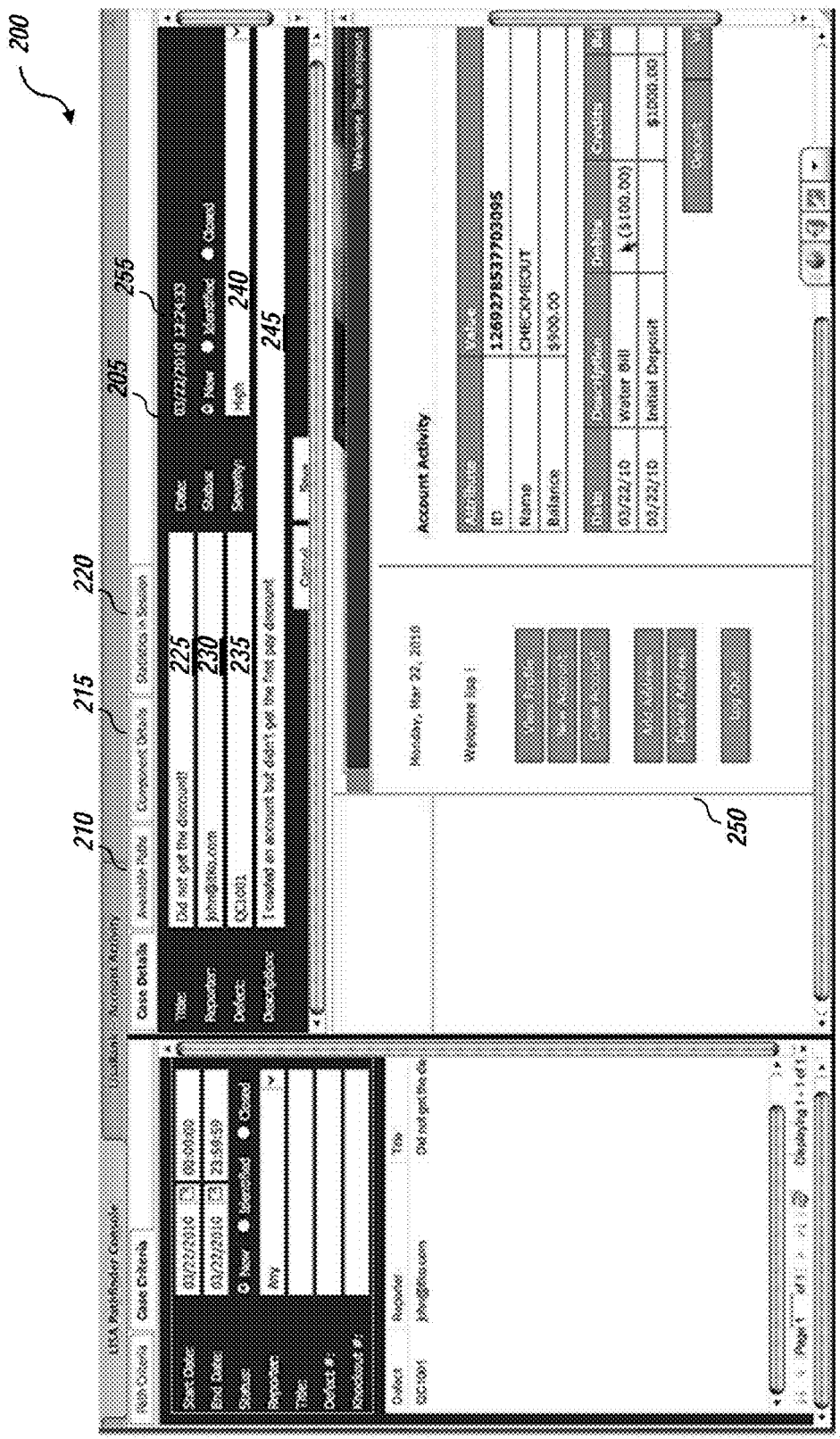
FIG. 2 is a screenshot of an example user interface display window allowing a tester to automatically generate a defect report that is to be linked with context information captured by distributed instrumentation units.

FIG. 2 is an example screenshot 200 of a portion of an example user interface window that can allow a tester-user to request the automatic generation of a defect report that is linked with transaction characteristics captured by an instrumentation system including one or more instrumentation agents 60. In this example, a tester has selected to access the defect reporting interface 205. Other interfaces can also be made available, such as an interface showing flow paths of system under test (e.g., by selecting tab 210), details and characteristics of components under test (e.g., by selecting tab 215), and statistics generated in connection with a testing session (e.g., by selecting tab 220). The defect reporting interface can include several fields (e.g., fields 225, 230, 235, 240, 245, etc.) allowing the tester to enter information about a defect identified by the tester, for instance, with assistance of a test module (e.g., 10). For instance, a tester-user can enter data into fields to provide a title or short description of the identified defect, issue, or event (e.g., at 225), along with data identifying the tester (e.g., at 230) and a defect identifier and/or category (e.g., at 235). The tester can indicate the severity or importance of an identified defect or event (e.g., at 240), as well as a description of the defect or event, for instance, as observed by the tester-user (e.g., at 245). A screenshot 250 of a user interface of the application or software component affected by the defect or event can also be automatically captured in connection with the generation of a defect report. In some instances, available screenshots can be captured automatically in response to a user request to launch the defect reporting interface 205, while in other instances, a test can specify whether to capture screenshots of user interfaces of the effected software component as well as which user interfaces or user interface views. Further, in some instances, additional metadata can be captured in connection with the capturing of a screenshot (e.g., 250), such as metadata identifying the software components, transactions, logic, etc. associated with the instance of the user interface captured by the screenshot. Such metadata can also be used to assist in associating certain instrumentation-unit-provided context information with the defect report.

Upon entering data into fields of the defect reporting interface window 205, as well as optionally including user interface screenshot data of effected software components, the tester can select to send or generate the defect report. In response, a defect report can be generated that includes the information and data specified by the tester-user through interface 205. Generating the defect report can also result in the identification of frames or data records generated by various instrumentation units 60 and stored, for instance, in memory and accessible by tester 10 and/or collaborative defect detection module 70. Based on information entered by the tester in the defect reporting interface 205, together with other data that can be automatically collected by the defect reporting interface in connection with the launch of the defect reporting interface, such as the identity of software components active, tested, or under inspection (e.g., during viewing of component details (e.g., at 215) by the tester) when the defect report was requested, the time 255 the defect report was requested, etc., one or more frames generated by instrumentation units 60 can be identified as relevant to the present defect report. For instance, an observed or user-entered time of the defect can be examined to find one or more frames that include timing information correlating to the time of the defect, to identify that the one or more frames may be relevant to the defect. Other correlations can be identified between information recorded in instrumentation-agent-generated frames and data gathered in connection with a defect report generation request or interface, such as the identity of one or more software components, the identity of a particular test, or particular data (e.g., its identification, data amount, etc.) at issue in connection with the identified defect, among other examples. Such frames can include context information gathered from software component during transactions by one or more instrumentation units 60. Consequently, context information from the frames can be copied, pulled, linked to, integrated with, or otherwise associated with a generated defect report.

In one illustrative example, in FIG. 2, a user has identified that, during the test of a particular e-commerce website hosted by a web server 20 in communication/cooperation with one or more backend software components (e.g., 30(1), 25, 40, etc.), that the website has failed to operate as expected. More specifically, in this example, the tester-user has identified that although the tester created an account in connection with the test of the website, a particular pay discount was not applied in a subsequent test step, contrary to what was desired or expected from the operation of the website. Upon identifying this defect, the tester-user requested (e.g., using a keystroke combination, user interface element or control, etc.) generation of a defect report to identify and report details concerning the defect. The user has entered details concerning the defect as well as a screenshot 250 of a user interface of the website. In response to requesting the report and/or completing the fields (e.g., 225, 230, 235, 240, 245) of the presented defect reporting interface 205, instrumentation-agent-generated frames can be identified and context information collected therefrom, specifying the context of the identified defect. For instance, in this examples, such context information might include information describing characteristics of a database (e.g., 30(1)) to manage user account data, as well as data describing transactions between software components (such as logic provided by one or more other software components to calculate particular pay discounts, among other examples. With this context data, developers can observe the generated report, including the user-entered details, captured screenshot 250, and automatically-gathered context information from instrumentation agents monitoring the software components at issue, to develop a more complete understanding of the defect as well as, in some instances, recreate the instance of the defect, for instance, using test module 10, so as to remedy the defect as well as the underlying cause(s) of the defect.

Figure 3:
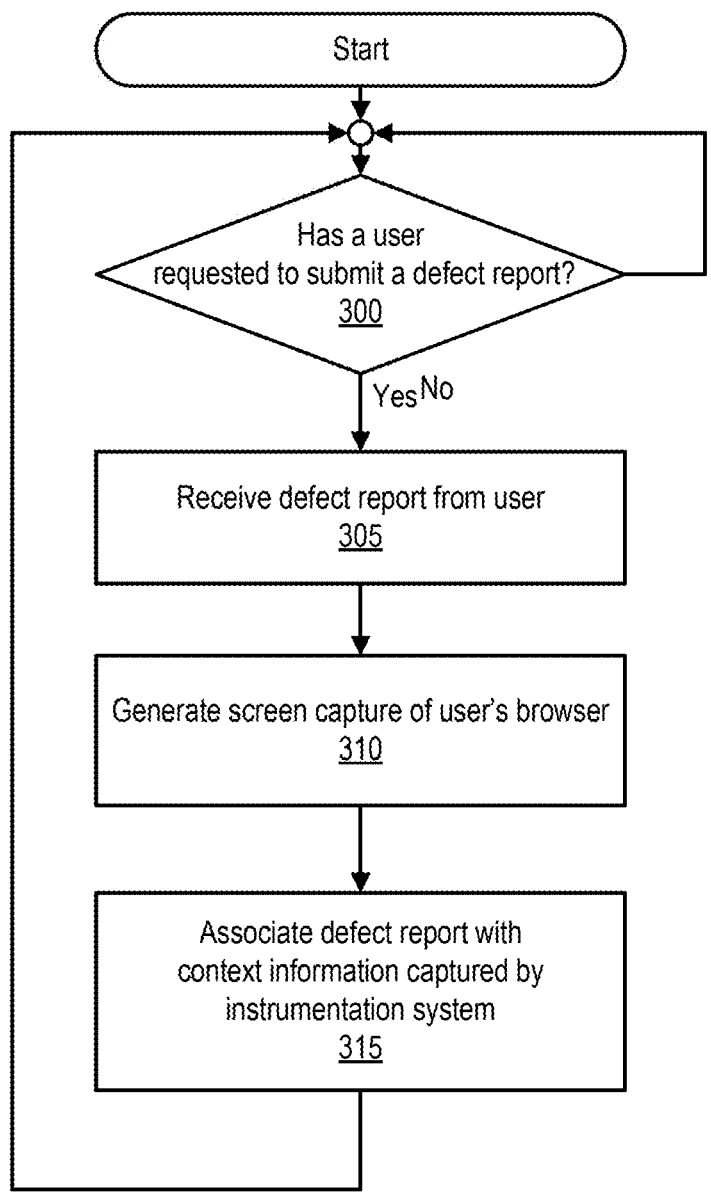
FIG. 3 is a flowchart of an example technique for automatically generating a defect report that is associated with context information captured by distributed instrumentation units.

FIG. 3 is a flowchart of an example technique for automatically generating a defect report that includes transaction characteristics captured by an instrumentation system. A user can request to submit a defect report, as shown at 300. In response, a defect report can be received from the user, as shown at 305. The received defect report can include user inputs entered in fields of the defect report. Further, in some implementations, a screen capture of the user's browser window can be generated in which the defect was detected, as shown at 310. The defect report and screen shot, if available, can then be associated with context information for one or more associated transactions, as shown at 315. Such techniques can be performed, for example, using a test module and/or collaborative defect detection module 70 in cooperation with instrumentation agents collecting context data from various software components within a particular software system.

Figure 4:
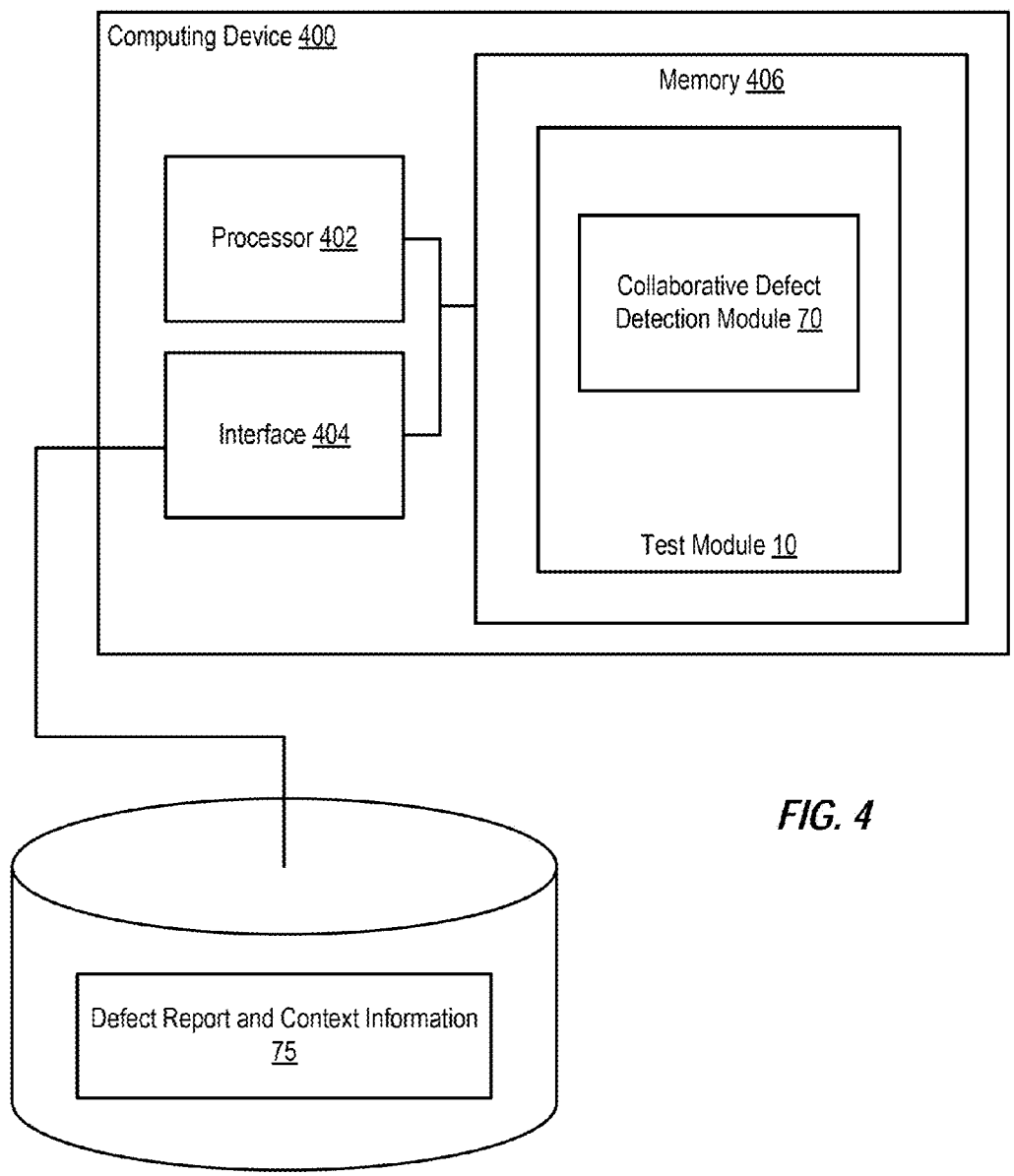
FIG. 4 is a block diagram of an example computing device, illustrating how an example collaborative defect detection module and other example components of a test module can be implemented in software, according to one embodiment.

FIG. 4 is a block diagram of an example computing system, illustrating how such a collaborative defect detection module 70 and other components of a testing system might be implemented in software. As shown, a computing system 400 can include one or more processors 402 (e.g., a microprocessor, programmable logic device (PLD), or application specific integrated circuit (ASIC), or multiple such processors), one or more interfaces 404, and one or more memory elements 406. Instructions executable by processor 402 can be stored in memory 406. These instructions can be executable to implement test module 10 and/or collaborative defect detection module 70. Computing system 400 can be a personal computer, server, personal digital assistant, cell phone, laptop, smartphone, tablet computer, workstation, or the like. Memory 406 can each include various types of computer readable storage media such as RAM (Random Access Memory), ROM (Read Only Memory), Flash memory, MEMS (Micro Electro-Mechanical Systems) memory, and the like. Processor 402, memory 406, and interface(s) 404 are coupled to send and receive data and control signals by a bus or other interconnect.

Interfaces 404 can each include an interface to a storage device on which instructions and/or data (e.g., such as data identifying a test case, a defect report, and/or context information, including information associating a defect report with a set of context information) are stored. Interfaces 404 can also each include an interface to a network, such as a local area network (LAN) or wide area network (WAN) such as the Internet, for use in communicating other devices and components. Such an interface can allow test module 10 to send requests to and receive responses from services and other test system components via a network. Similarly, such an interface can allow a test module to receive context information generated by instrumentation units. Interface 404 can also include interfaces to various peripheral Input/Output (I/O) devices, such as a monitor, on which a graphical display (e.g., allowing a user to view a model and control the testing of system under test by interacting with the model) can be displayed.

In some instances, test module 10 can include collaborative defect detection module 70. In other instances, collaborative defect detection module 70 can be provided as a standalone component. In either implementation, collaborative defect detection module 70 can be configured to associate context information received from several different instrumentation units with a defect report submitted by a tester.

Program instructions and data implementing various software components such as test module 10 can be stored on various computer readable storage media such as memory 406. In some embodiments, such program instructions can be stored on a computer readable storage medium such as a CD (Compact Disc), DVD (Digital Versatile Disc), hard disk, optical disk, tape device, floppy disk, and the like. In order to be executed by a processor, the instructions and data are loaded into memory from the other computer readable storage medium. The instructions and/or data can also be transferred to a computing device for storage in memory via a network such as the Internet or upon a carrier medium.

It is noted that the above figures illustrate specific examples. In other embodiments, different components can be used to implement the testing functionality described above. For example, while specific software components have been described as implementing specific functionality, this functionality can be implemented by different components than those depicted herein. For example, the functionality of test module 10 can be subdivided into multiple other test management components or integrated into another component. Furthermore, the specific components depicted in the figures herein can be combined or subdivided into fewer or additional components.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java™ Beans (EJBs) or design-time components may have the ability to generate run-time implementations into different platforms, such as J2EE (Java™ 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, that are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
receiving a request from a user to generate a defect report for a defect observed by the user within a software system under test, wherein the request comprises information identifying characteristics of the defect and a screenshot of a user interface of the software system under test corresponding to the observed defect;
identifying, using at least one processing device, context information provided by a plurality of instrumentation units, each instrumentation unit in the plurality of instrumentation units monitoring one or more respective software components within the system under test, wherein the context information identifies characteristics of a plurality of transactions performed in the system under test and the context information comprises characteristics of detected requests and responses in each of the plurality of transactions and activity internal to at least one of the one or more software components during one or more of the plurality of transactions;
searching the context information, based on the request, to determine a particular subset of the context information corresponding to the characteristics of the defect, wherein the particular subset of the context information is determined based on identifying a correlation between the characteristics of the defect and characteristics of transactions identified in the particular subset of the context information;
automatically, using at least one processing device, associating the particular subset of the identified context information with the defect; and
generating the requested defect report to include the context information associated with the identified defect.

2. The method of claim 1, wherein the identified correlation includes a correlation between a particular software component identified in each of the request and the particular subset of the context information.

3. The method of claim 1, wherein the identified correlation includes a correlation between first timing information identified in the request and second timing information identified in the particular subset of the context information.

4. The method of claim 3, wherein the first timing information identifies timing of the defect and the second timing information identifies timing of a particular transaction performed by the system under test.

5. The method of claim 1, wherein the identified correlation includes a correlation between aspects of a particular transaction identified in both the request and the particular subset of the context information.

6. The method of claim 1, wherein the identified correlation includes a correlation between aspects of a particular data structure identified in both the request and the particular subset of the context information.

7. The method of claim 1, wherein the request includes user-entered data describing aspects of the defect as observed by a user to be included in the defect report.

8. The method of claim 7, wherein the user-entered data is collected from a user interface automatically launched in connection with the request to generate the defect report.

9. The method of claim 8, wherein the user interface is launched from an interface of a particular software component.

10. The method of claim 9, wherein the user interface is launched by a particular instrumentation unit monitoring the particular software component.

11. The method of claim 1, wherein the request includes data automatically collected identifying a context of the receipt of the request to generate the defect report.

12. The method of claim 11, wherein the context of the receipt of the request to generate the defect report includes at least one of a set including a time at which the request to generate the defect was received and an identity of a particular test run proximate in time with the received request to generate the defect report.

13. The method of claim 1, wherein the screenshot is associated with a particular software component affected by the observed defect.

14. The method of claim 13, wherein the screenshot is automatically captured in response to the receipt of the request to generate the defect report.

15. The method of claim 1, wherein automatically associating at least some of the identified context information with the defect includes:
identifying that the defect is potentially related to a particular transaction performed in the system; and
associating context data identifying characteristics of the particular transaction with the defect.

16. The method of claim 1, wherein the context information includes a first set of information generated by a first instrumentation unit in the plurality of instrumentation units monitoring a first software component within the system under test and a second set of information generated by a second instrumentation unit in the plurality of instrumentation units monitoring a second software component within the system under test, wherein each of the first and second sets of information identify characteristics of a particular transaction performed in the system.

17. The method of claim 16, wherein the first and second software components are involved in the particular transaction.

18. The method of claim 1, wherein the defect involves a webpage served by a web server and displayed in a web browser and the request to generate the defect report is received via the web browser.

19. An article comprising non-transitory, machine-readable media storing instructions operable to cause at least one processor to perform operations comprising:
receiving a request from a user to generate a defect report for a defect observed by the user within a software system under test, wherein the request comprises information identifying characteristics of the defect and a screenshot of a user interface of the software system under test corresponding to the observed defect;
identifying context information provided by a plurality of instrumentation units, each instrumentation unit in the plurality of instrumentation units monitoring one or more respective software components within the system under test, wherein the context information identifies characteristics of a plurality of transactions performed in the system under test and the context information comprises characteristics of detected requests and responses in each of the plurality of transactions and activity internal to at least one of the one or more software components during one or more of the plurality of transactions;

searching the context information, based on the request, to determine a particular subset of the context information corresponding to the characteristics of the defect, wherein the particular subset of the context information is determined based on identifying a correlation between the characteristics of the defect and characteristics of transactions identified in the particular subset of the context information;

automatically associating the particular subset of the identified context information with the defect; and generating the requested defect report to include the context information associated with the identified defect.

20. A system comprising:

a memory element storing data;

a processor operable to execute instructions associated with the stored data;

collaborative defect detection module configured to:

search context information in response to a request to generate a defect report for a defect observed within a software system, wherein the request comprises information identifying characteristics of the defect, the characteristics include a screenshot of a user interface of the software system under test corresponding to the observed defect, the context information is searched to identify a particular subset of the context information corresponding to the characteristics of the defect, the context information identifies characteristics of a plurality of transactions performed in the system under test, the particular subset of the context information is determined based on identifying a correlation between the characteristics of the defect and characteristics of one or more transactions identified in the particular subset of the context information, the context information is provided by a plurality of instrumentation units monitoring software components within the system under test, and the context information comprises characteristics of detected requests and responses in the transactions and activity internal to at least one of the one or more software components during the transactions; and automatically associate the particular subset of the identified context information with the defect for inclusion in the requested defect report.

21. A method comprising:

monitoring a first software component, using an instrumentation unit interfacing with the first software component, the first software component included within a particular software system;

capturing a first set of information using the instrumentation unit, the first set of information including context information identifying characteristics of involvement of the first software component in a particular transaction involving at least one other second software component, wherein the characteristics comprise a characteristic of data sent between the first and second software components during the particular transaction and a characteristic of an activity internal to the first software component during the particular transaction, and the first set of information further identifies involvement of the second software component in the particular transaction; and providing, using the instrumentation unit, the first set of information to a collaborative defect detection module for use by the collaborative defect detection module in:

associating at least a portion of the context information captured by the instrumentation unit with one or more defects identified in requests to generate one or more defect reports, and one or more screenshots of a user interface of the particular software system, wherein the screenshots are to illustrate an observed defect associated with at least one of the defect reports, and automatically including the associated context information within the one or more defect reports.

22. The method of claim 21, wherein the first set of information includes timing information and the model includes a representation of the ordering of the respective involvement of the first and second software components in the particular transaction.

* * * * *